Jan. 21, 1936. W. D. HODSON 2,028,157
WIRE ROPE
Filed Sept. 17, 1934
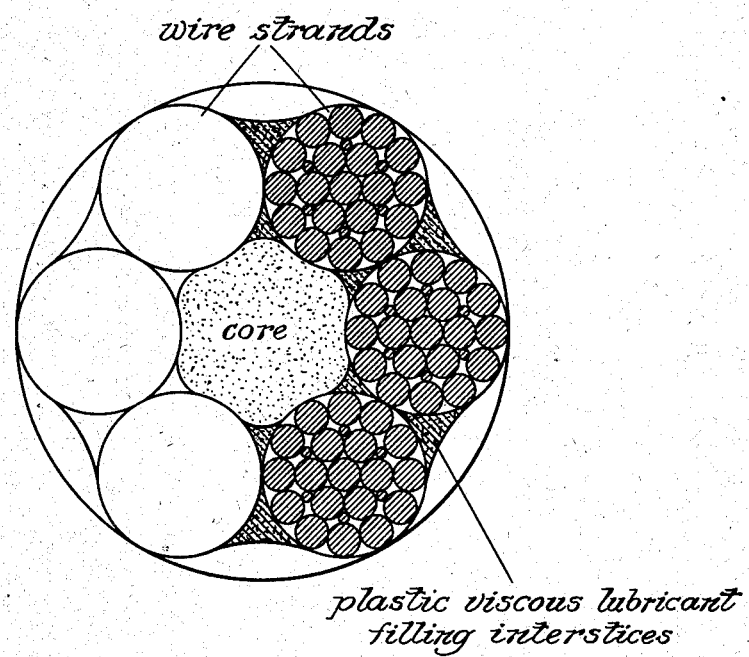
Inventor:
Walter D. Hodson.
By Dyrenforth, Lee, Chritton & Wills
Attys.

Patented Jan. 21, 1936

2,028,157

UNITED STATES PATENT OFFICE 2,028,157

WIRE ROPE

Walter D. Hodson, Chicago, Ill.

Application September 17, 1934, Serial No. 744,425

5 Claims. (Cl. 117—53)

This invention relates to an improved wire rope, and particularly to a lubricated wire rope.

This application is a continuation in part of my co-pending application 636,094.

In my copending application, Serial No. 637,007, a method of lubricating wire rope cores is described. The problems confronting the lubrication of wire ropes themselves present wholly new difficulties. It has heretofore been the general practice to lubricate wire ropes by flowing lubricant from a heated kettle onto the wires at the end of the stranding machine, just before the wires pass into the closing die. Inasmuch as the stranding machines rotate the wires at high speeds, for example, as high as 500-1000 R. P. M., it has been necessary, in order to have the oil pass onto all of the wires, to use a very thin oil.

The result is that only a thin film of oil can be retained upon the wires, which affords no adequate lasting protection for the rope. Likewise, there is insufficient oil present to fill the interstices in the rope when the strands are later wound together about a core. The oils previously used have likewise necessarily been of such character that under climatic changes and operating conditions the lubricant is very rapidly dissipated.

The single figure of the accompanying drawing is a diagrammatic illustration of a wire rope embodying my invention.

In accordance with the present invention, the wires, before closing of the strands, are passed through a plastic jelly-like adhesive mass of lubricant, preferably cold. As a result, thick rings of lubricant attach themselves to the wires, and as the wires close together in the die the lubricant is forced into the voids and interstices of the strands. Moreover, due to the gummy tenacious character of the lubricant, there is sufficient excess so that upon winding of the strands into rope, the voids and interstices of the rope are likewise filled with the lubricant. There is also little or no running out of the lubricant under high temperatures occasioned by climatic changes or operating conditions. The preferred lubricant comprises a fibrous absorbent base or filler such as finely divided ground asbestos. The base of itself may act as a lubricant, and also prevents metal-to-metal contact of the wires, besides holding a much larger amount of lubricant. Other absorbent fibrous materials such as jute, cotton linters, cotton hull fibre, or the like, may be employed, if desired.

A grease is incorporated with the base. The term "grease" is herein used to cover not only technical greases but oils having the characteristics of greases, in that they will produce a thick, heavy, tenacious mass of lubricant. The character of the grease will depend upon the use to which the wire rope is to be put. For example, where high temperatures are likely, a more viscous grease or oil may be used. For heavier duty, a suitable heavy duty lubricant is preferably employed.

A preferred grease may be prepared from a viscous mineral oil, an aluminum soap, and an asphaltic or blown oil. For example, a grease may be prepared from 39 parts of a heavy naphthalene oil of 190-210 viscosity at 210° F., 1 part of aluminum oleate, and 50 parts of a blown oil having approximately 100 melt point and a penetration in the order of 200 at 77° F.

In place of the aluminum oleate, other aluminum soaps such as the tungate, linoleate, or the corresponding soaps of zinc, lead, sodium, calcium, or the like may be employed.

Ordinarily the type of air-blown oil or residuum of the character generally known as "saturation" is employed. However, other blown oils having melting points as high as 200° F. or higher, or fluid saturations may be used, depending upon the particular characteristics of the lubricating compound desired.

The fibrous base is incorporated in the lubricant in proportions depending upon the absorbing qualities of the base. A well ground good quality asbestos may be used in the proportion of 10 parts asbestos to 90 parts lubricating compound. A standard raw type of asbestos fibre as received from the mines, ground and treated, can be made in varying degrees of fineness to meet different operating conditions. For elevator or cable ropes requiring great flexibility, and a high degree of lubrication, the more highly ground fibres are preferable. For marine purposes, or standing rigging requiring high moisture and corrosion resistance and subject to heavy strain, a tougher and coarser fibre is preferable. Likewise, for such purposes a larger proportion of the fibre and the blown oil should be used.

In the case of elevator or cable ropes, it has likewise been found that in prior practice the action of the lubricant on the sheaves and drums with which they contact is unsatisfactory, particularly in causing slippage.

It has been discovered that this difficulty may be overcome by incorporating in the lubricant a small proportion of a top drier, which dries on the surface of the lubricant only, upon exposure to the air; for example, one to three per cent. of a cobalt or lead drying composition may be incorporated. Such a composition may consist, for example, of 1-2% cobalt oxide and 98-99% linseed oil. Such a drier incorporated in the lubricant causes the exterior thereof to become quickly tough and rubbery, thereby affording a better protection to the wire, tending to prevent the loss of lubricant from the interior, as well as eliminating slippage of the rope.

The proportions of ingredients may be varied quite widely, as the following examples will show.

|  | I | II | III | IV |
|---|---|---|---|---|
| Mineral oil | 38.3125 | 36.25 | 44.50 | 28 |
| Coarse asbestos | 9.5625 | 11.25 | 4.50 | 18 |
| Fine asbestos | 1.0625 | 1.25 | .50 | 2 |
| Aluminum oleate | 1.0625 | 1.25 | .50 | 2 |
| Blown oil | 50 | 50 | 50 | 50 |

The foregoing detailed description has been given for clearness of understanding only, and no unnecessary limitations should be understood therefrom, but the appended claims should be construed as broadly as permissible, in view of the prior art.

What I regard as new and desire to secure by Letters Patent is:

1. A wire rope comprising a plurality of strands of wire wound about a central core, and having within and about said strands a viscous plastic adhesive lubricating compound including a top drier, said compound substantially filling the interstices of the strands, and the proportion of top drier in said lubricating compound being such as to produce a tough leathery surface on exposure of the lubricant to air, without affecting the plastic character of the body of the lubricant.

2. A wire rope comprising a plurality of strands of wire wound about a central core, and having within and about said strands a viscous plastic adhesive lubricating compound substantially filling the interstices of the strands; said lubricating compound comprising an absorbent fibrous base, a grease, and a small proportion of a top drier, in proportions to produce a permanently plastic lubricant having a tough leathery surface on exposure to air.

3. A wire rope as set forth in claim 2 in which the lubricating compound includes a viscous grease.

4. A wire rope comprising a plurality of strands of wire wound about a central core, and having within and about and substantially filling the interstices of said strands a viscous, plastic adhesive lubricating compound comprising an absorbent fibrous base, and a grease comprising a viscous mineral oil, a gelling soap, a blown oil, and a top drier in proportions to produce on exposure to air a permanently plastic lubricant having a tough, leathery surface.

5. A wire rope as set forth in claim 4 in which the lubricating composition comprises approximately 28 to 44½ parts of a heavy mineral oil, ½ to 2 parts of aluminum oleate, 50 parts of blown oil, and 5-20 parts of finely divided asbestos, and a small proportion of a top drier.

WALTER D. HODSON.